United States Patent [19]

Williams

[11] 3,966,856

[45] June 29, 1976

[54] METHOD FOR THE PRODUCTION OF PEARLESCENT BUTTON BLANKS

[75] Inventor: Charles H. Williams, Export, Pa.

[73] Assignee: Koppers Company, Inc., Pittsburgh, Pa.

[22] Filed: June 20, 1975

[21] Appl. No.: 588,671

Related U.S. Application Data

[60] Continuation of Ser. No. 431,225, Jan. 7, 1974, abandoned, which is a division of Ser. No. 248,702, April 28, 1972, Pat. No. 3,801,253.

[52] U.S. Cl. ................................. 264/71; 264/108; 264/297; 264/299; 264/334
[51] Int. Cl.² ...................... B29D 19/02; B29C 5/10
[58] Field of Search ............... 264/69, 71, 108, 162, 264/331, 299, 313; 425/324, 371, 801

[56] References Cited
UNITED STATES PATENTS

| | | | |
|---|---|---|---|
| 3,010,158 | 11/1961 | Broderson | 264/108 |
| 3,041,670 | 7/1962 | Broderson | 264/108 |
| 3,211,817 | 10/1965 | Sucher | 264/108 |
| 3,222,439 | 12/1965 | Bolomey et al. | 264/108 |
| 3,499,954 | 3/1970 | Trojan et al. | 264/108 |
| 3,526,927 | 9/1970 | Villain | 264/108 |

Primary Examiner—Willard E. Hoag
Attorney, Agent, or Firm—Oscar B. Brumback; Herbert J. Zeh, Jr.

[57] ABSTRACT

Method of making pearlescent button blanks by casting and polymerizing a liquid polymerizable resin containing light-reflecting platelets in cavities having the desired form of the button blanks. Pearlescence is imparted to the button blanks by orienting the light-reflecting platelets parallel to the surfaces of the blanks by scuffing a surface of the resin in the cavities during polymerization of the resin. Apparatus for producing buttons by the method of the invention includes a continuous perforated belt and two continuous solid belts that sandwich the perforated belt. The scuffing action for orienting the light-reflecting platelets is produced by sliding the solid belts across the surfaces of the perforated belt.

10 Claims, 3 Drawing Figures

METHOD FOR THE PRODUCTION OF PEARLESCENT BUTTON BLANKS

This is a continuation of application Ser. No. 431,225, filed Jan. 7, 1974, and now abandoned, which is a division of application Ser. No. 248,702, filed Apr. 28, 1972, now U.S. Pat. No. 3,801,253.

THE BACKGROUND OF THE INVENTION

1. Field of the Invention

The invention relates to methods for producing pearlescent button blanks.

2. Description of the Prior Art

A large part of the millions of buttons manufactured each year for clothing and the like are produced from liquid polymerizable resins that contain light reflecting materials (which are characteristically platelets, or lamellae) for imparting pearlescence and iridescence to the finished buttons.

The resins are generally cast into large sheets which are polymerized to a solid, non-tacky state. Button blanks of a desired shape and size are punched, or blanked, from the large sheets and are subsequently machined to produce the finished buttons.

To produce the pearlescence in the polymerized resin sheets the sheets are subjected to various operations prior to or during polymerization, or both, which tend to orient the light reflecting platelets parallel to the surface of the sheets. The various operations include: (1) the casting of the resins between sealed glass plates which are then rocked or vibrated in a direction that is parallel to the major dimension of the plates, (2) centrifugal casting of the sheets within large drums and (3) extrusion of the resin mixture through a constriction which produces a shearing action on the resin.

All of the various methods for producing pearlescent button blanks produce large amounts of waste ligament during the punching operation. Additionally, the edges of many of the button blanks are chipped and the blanks must be discarded. The total amount of waste material produced in these operations may be as much as 22% to 28% of the volume of the cast sheets.

SUMMARY OF THE INVENTION

The large amounts of unusable waste ligament resulting from the heretofore known processes for the production of pearlescent button blanks is eliminated in accordance with this invention by casting a liquid polymerizable resin containing light-reflecting platelets in confined regions having the desired form of the button blanks and thereafter polymerizing the resin while simultaneously scuffing the surface of the resin in the cavities to orient the light-reflecting platelets.

Apparatus for carrying out the method of the invention comprises a continuous perforated belt and two continuous solid belts that sandwich a portion of the perforated belt. The solid belts move with the perforated belt, although the solid belts move at a speed slightly different from the speed of the perforated belt, through a so-called polymerization zone. Resin cast into the cavities of the perforated belt polymerizes while it is sandwiched between the two solid belts and while it is being simultaneously subjected to a scuffing action at its surfaces. The scuffing action is brought about by the differences in speed between the two solid belts and the perforated belt and the action may be enhanced by vibrating the solid belts across the surfaces of the perforated belt or by vibrating the perforated belt with respect to the solid belts and may be further enhanced by oscillating the perforated belt with respect to the solid belts.

The invention may be better understood, however, by referring to the detailed description in conjunction with the drawings.

DETAILED DESCRIPTION

Figure 1:
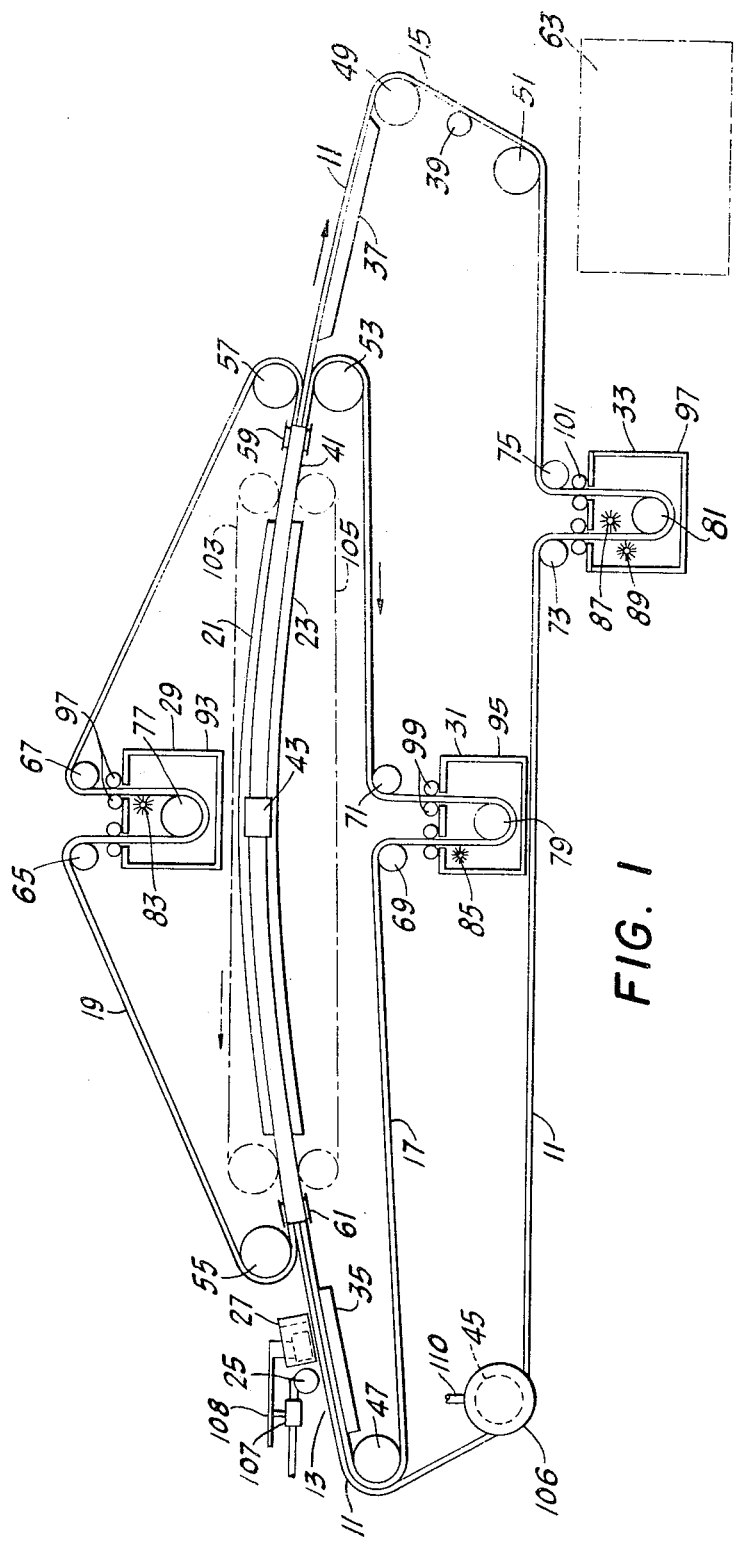
FIG. 1 is a simplified drawing of apparatus that may be used to carry out the method of the invention and illustrates the use of a continuous perforated belt for continuously producing the pearlescent button blanks.

Large amounts of waste ligament have generally been associated with the heretofore known processes for the production of pearlescent button blanks. This invention eliminates the waste by casting and polymerizing a liquid polymerizable resin, containing light-reflecting platelets, in confined regions having the desired form of the button blanks. The term "confined regions" as used herein is intended to include any closed area having the desired configuration of finished button blanks and includes, for example, the cavities, or perforations, of a perforated belt or sheet. The confined regions serve as individual molds for the button blanks. As will be discussed below, resin cast into the confined regions will contain light-reflecting platelets that, for purposes of providing high degrees of pearlescence, must be oriented with their major dimension parallel to the resin surface or surfaces (which will be the major dimension of the finished button blank). The platelets are oriented, according to the invention, by scuffing a resin surface during polymerization of the resin. The confined regions must provide therefore for contact of the resin surface during polymerization.

The term "pearlescent" is used herein generically to describe the lustrous, rainbow-like appearance of buttons that is commonly designated in the button industry by the terms pearly, nacreous, silky, metallic, chantoyant, pearlescent, and iridescent.

The pearlescent effect is generally imparted to the buttons by including in the resins from which the buttons are formed a number of materials which have the common characteristic of being light-reflecting platelets, or lamellae. High degrees of pearlescence are obtained by orienting or positioning a major portion of the platelets in the resin such that their major dimension is substantially parallel to the resin, button, surface. Examples of light-reflecting platelets commonly used in the button industry include basic lead carbonate, lead hydrogen arsenate, lead hydrogen phosphate, vismuth oxy-chloride, and titanium dioxide. The light-reflecting platelets are usually added to the liquid polymerizable resins in an amount of from 1% to 5% by weight based on the weight of the resin.

The resins useful in the invention include those that are liquid, i.e., capable of flowing, at room temperature and that can be polymerized to a substantially solid, non-tacky form in a matter of minutes at room temperature or slightly elevated temperatures with or without the use of suitable catalysts. Examples of these resins are (1) polyester resins, which comprise a cross-linking vinyl monomer and an unsaturated polyester, or alkyd, which alkyd is formed by condensing and esterifying a polyhydric alcohol and a polycarboxylic acid; (2) various materials containing ethylenic linkages, such as divinyl benzene, diallyl phthalate, diallyl malonate allyl methacrylate, diallyl carbonate and the like; (3) monoethylenic resin-forming materials, such as methyl methacrylate and styrene; and (4) condensation polymers including epoxy resins, phenol-formaldehyde resins and melamine.

The viscosity of the resin as it is cast into the confined regions is not critical for purposes of the invention but the resin should be viscous enough to remain, for example, in the cavities of a perforated belt when the belt is resting on a flat, smooth surface but yet not so viscous as to prevent the elimination of entrapped air or to affect east of casting. A viscosity of 800 to 1400 cps is generally suitable for purposes of the invention.

The light-reflecting platelets may be added to the resin at any time prior to the polymerization of the resin and are conveniently added to the resin in a mixing tank adjacent the button blank apparatus. The light reflecting-platelets are mixed into the resin as closely as is possible to the time of polymerization to minimize the tendency of the platelets to settle out of the resin and to provide a uniform dispersion.

The light-reflecting platelets after mixing, although uniformly dispersed in the resin, are randomly oriented in the resin and do not impart a high degree of pearlescence to the finished button blanks. The degree of pearlescence is increased by increasing the number of platelets that are oriented with their major dimension parallel to the resin surface. As mentioned previously this orientation of the platelets has been accomplished in the heretofore known methods of producing button blanks by rocking, centrifugal casting and the like. All of the heretofore known methods of orientation are suitable for the production of large sheets of resin but cannot be employed in the process of the invention where the resin is cast in confined regions having the desired form of the finished button blanks. In accordance with the invention, therefore, the light-reflecting platelets are oriented by scuffing one or both surfaces of the resin in the confined regions prior to or during the polymerization of the resins. The scuffing action is accomplished by sliding a flat surface which contacts a resin surface across the resin surface and is most effective, of course, when the resin is in the early stages of polymerization and has a low viscosity. The scuffing imparts shear forces to the resin in a direction that is parallel to the resin surface. These forces are transmitted from the resin surface to the body of the resin by viscous forces and serve to orient a large proportion of the light-reflecting platelets parallel to the resin surface.

Apparatus for carrying out the method of the invention is illustrated in FIG. 1. Referring to FIG. 1, the apparatus includes a continuous flexible perforated belt 11 having for purposes of description, a material receiving portion 13 and a material discharging portion 15. Two continuous solid, imperforate, belts 17 and 19 sandwich a portion of the upper run of the flexible belt 11 (between its material receiving portion 13 and material discharging portion 15). These belts move at different speeds and this difference provides the scuffing action for orienting the light-reflecting platelets.

Radial pressure shoes 21 and 23 maintain intimate contact between the solid belts and the perforated belt and are thermally zoned to effect or to accelerate the polymerization of the liquid polymerizable resin. (The portion of the apparatus including the two solid belts and radial pressure shoes is referred to hereafter as the polymerization zone.) Also illustrated in FIG. 1 are: a resin feed distributor 25, a regulator 107 and float 108 and a doctor blade 27 that supply and apply the liquid polymerizable resin to the cavities of the perforated belt 11 at its material receiving portion 13; means 29, 31 and 33 for cleaning the surfaces of the perforated belt 11 and solid belts 17 and 19; support plates 35 and 37 for the perforated belt 11; means 43 for vibrating the belts; cam roller 106 and cam follower 110 for oscillating the perforated belt parallel to the axis of the driving roller 45, and consequently the major dimension of the perforations in the belt; an air nozzle 39 for insuring that the polymerized resin is removed from the cavities of the perforated belt 11 at its material discharging end 15; belt sealing means 41; and various belt drive and idler rollers. Wear belts 103 and 105 (shown in phantom lines) may also be provided to prolong the life of the solid continuous belts 17 and 19.

The continuous, flexible, perforated belt 11 has a plurality of cavities of a predetermined shape and size, that desired of the button blanks, spaced along its length and into which the liquid polymerizable resin is cast. The term "cavities" is used herein to define perforations or holes, as opposed to hollows, in the perforated belt. The thickness of belt 11 is dependent on the desired thickness of the button blanks. The length of the belt is dependent on the type of resin employed or, more specifically, the time that it takes the particular resin employed to polymerize to a solid, non-tacky state; the speed of the belt; the desired production rate of button blanks; the width of the belt and of course space limitations. The length of belt is generally determined, however, by the polymerization time of the resin employed and the speed of the belt because the production rate can be varied according to the width of the belt and according to the desired size and variety of the button blanks. The speed of the belt itself is dependent upon the type of driving means used. Thus, for a resin that requires 5 minutes to harden to a solid, non-tacky state and a belt speed of 1 inch/sec. the belt length in the above-described polymerization zone should be at least 25 feet. The belt length may be decreased by initiating the polymerization of the resin prior to entering the polymerization zone. The overall length of belt will be two to three times greater than the length of the polymerization zone depending on the physical layout of the remaining pieces of equipment of the apparatus.

The perforated belt 11 may be made of any commercially available material having sufficient tensile strength to withstand the constant inherent tension under which the belt operates. The belt may be stainless steel or any of a number of commercially available synthetic rubber of plastic materials. Because the perforated belt 11 undergoes a sliding or scuffing action with respect to the continuous, flexible solid belts 17 and 19 it is preferably comprised of a self-lubricating, or Teflon-like material such as, for example, polyethylene. As mentioned above, the light-reflecting platelets may be oriented by vibrating the perforated belt to provide a sliding action with respect to the solid belts. Various means may be employed for vibrating the belt but if an electromagnetic means is used the perforated belt will have to be comprised, at least in part, of a metallic substance responsive to magnetic forces.

The continuous perforated belt 11 is supported by a flanged drive roller 45, idler rollers 47, 49, and 51 and supporting plates 35 and 37, all of which are supported on a suitable table or other supporting means (not shown in the drawing). The driving means for flanged drive roller 45 should be capable of operating at various speeds so that the apparatus may be employed with various liquid polymerizable resins having different polymerization or solidification times.

Figure 2:
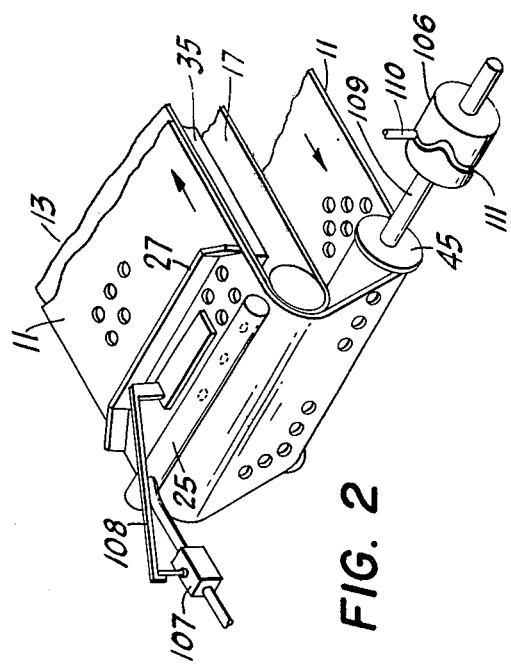
FIG. 2 is an enlargement of a portion of the apparatus of FIG. 1 showing in isometric view the means for applying the liquid polymerizable resin to the continuous perforated belt.

The scuffing action described above may be provided in part by oscillating the perforated belt 11 at its material receiving portion 13. Means for oscillating belt 11 is shown in FIG. 2 and comprises the flanged drive roller 45 and a cam mechanism that comprises a cam roller 106 connected to drive roller 45 by means of a shaft 109. Cam roller 106 cooperates with a fixed cam follower 110 by means of a groove 111 in cam roller 106. As drive roller 45 is driven (by a suitable means not shown) the driving force is transmitted to the cam roller 106 through the shaft 109 causing the cam roller 106 to rotate at the same speed as the drive roller 45. As cam roller 106 rotates it cooperates with fixed cam follower 110 through groove 111 and is caused to oscillate in a direction parallel to the axis of the drive roller 45. This oscillatory motion is transmitted to flanged drive roller 45 and belt 11. The oscillatory movement of belt 11 with respect to solid belts 17 and 19 causes the above described scuffing action. The amplitude of the oscillation is greatest at the material receiving end of the apparatus and gradually decreases to zero at the material discharge end where the belt is stationary to movement parallel to the axis of idler roller 49. Thus, the oscillatory movement is greatest (and so the scuffing action on the resin surface) when the resin is in the early stages of polymerization. An overall cyclic movement of roller 45 of ½ inch to 2 inches will generally provide an effective scuffing action.

Referring again to FIG. 1 the continuous flexible solid belts 17 and 19 may be comprised of any commercially available material having sufficient strength to withstand the inherent tension under which they operate and should each have a substantially smooth surface on the side that contacts the perforated belt in order to minimize friction with the perforated belt, and to increase the efficiency of the scuffing action on the surfaces of the resin in the filled cavities. Additionally since the previously described scuffing action is accomplished, at least in part, by vibrating the solid belts with respect to the perforated belt the solid belts should be made of a material responsive to magnetic forces if an electromagnetic means of vibrating the belts is used. Solid belt 17 is supported by idler roller 47 and support plate 35 and is driven by drive roller 53; solid belt 19 is supported by idler roller 55 and is driven by drive roller 57. The drive rollers 53 and 57 are capable of various speeds and along with idler rollers 47 and 55 are supported by a suitable table or the like.

Pearlescent button blanks are produced in the apparatus of FIG. 1 by casting a liquid polymerizable resin in the cavities on the perforated belt 11 at its material receiving portion 13, polymerizing the resin to a solid, non-tacky state while simultaneously scuffing the surface of the resin in the filled cavities and ejecting the pearlescent button blanks from the cavities of the perforated belt 11 at its material discharging portion 15.

The portion of the perforated belt 11 from which the pearlescent button blanks have been ejected is cleaned and returned to receive another quantity of liquid polymerizable resin at the material receiving portion 13.

The means for applying the liquid polymerizable resin to the perforated belt is shown in FIG. 2. The means include a resin feed distributor 25, regulator 107 and float 108 and doctor blade 27. Resin is pumped to the feed distributor 25 from one or more resin mixing tanks and is applied to perforated belt 11 at a controlled rate, which is determined experimentally, in the form of a sheet of resin or a plurality of ribbons of resin across the width of the perforated belt 11. The flow rate is controlled by means of the intimate 107 and float 108 intimate which also acts as a safety valve to stop the flow of the resin if the resin builds up to unacceptable proportions behind the doctor blade 27.

The perforated belt 11, after receiving resin from the resin feed distributor 25, and solid belt 17 move into the so-called polymerization zone where the upper surface of the perforated belt 11 is brought into contact with solid belt 19 thereby forming a sandwich of belts. The sandwich of belts then passes intimate radial pressure shoes 21 and 23 (so-called because of their arcuate curvature). Radial pressure shoe 23 has a slight upward curvature to utilize the force of gravity and belt tension to force the solid belts 17 and 19 and perforated belt 11 into intimate contact with one another. Radial pressure shoe 21 also has an arcuate curvature and cooperates with the sandwich of belts passing over radial pressure shoe 23 and provides a slight pressure to the top of the sandwich of belts to prevent any jumping of the belts. Radial pressure shoes 21 and 23 thus insure that initmate contact is maintained between the belts in the polymerization zone.

Intimate contact between the belts while in the polymerization zone is desirable for several reasons. Firstly, during the polymerization of some liquid polymerizable resins it is necessary to exclude air from coming into contact with the resins because air may cause the polymerized resins to have a tacky surface. A tacky surface could, of course, interfere with the removal of the polymerized resins from the cavities of the perforated belt. Secondly, the scuffing action necessary to orient the light-reflecting platelets in the resin is dependent upon intimate contact of the solid belts with the resin in the filled cavities. Thirdly, depending on the particular resin used it may be desirable to effect or accelerate the polymerization of the resin. The effecting or acceleration of the resin may be accomplished by heating or alternatively, alternately heating and cooling the resin, by means of the radial pressure shoes or by controlling the temperature of the solid belts. Whichever means is used, heat transfer between adjacent objects is best when the objects contact each other.

The radial pressure shoes are thermally zoned and may be made of any commercially available conductive material to provide for the transmission of heat to or from the sandwich of belts. The term "thermally zoned" used herein means that heating or cooling elements are provided in the radial shoes to heat or to alternatively, alternately heat and cool the resin in the filled cavities for the purpose of accelerating or effecting the cure of certain of the liquid polymerizable resins that may be used in conjunction with the invention. It is believed that the alternate heating and cooling may thermally "shock" a resin and provide a faster cure than heat alone. The width of the radial pressure shoes will be at least that of the solid and perforated belts and their length will be as long as is possible with respect to cost and space considerations so as to maintain the scuffing action at the surface of the resin in the filled cavities for the longest possible period of time. When the radial pressure shoes are used in conjunction with a resin requiring elevated temperatures for its polymerization the length of the shoes should be as great as the product of the polymerization time multiplied by the speed of the belt (as well as any necessary conversion factors).

It should be noted here that although a surface of the resin in the filled cavities is said to be subjected to the scuffing action, both surfaces of the resin in the filled cavities may be (and will generally be) subjected to the scuffing action depending on whether it is desirable to have the pearlescent effect on both sides of the finished button blank.

The radius of the arc of the radial pressure shoes is not critical but should be great enough to provide for intimate contact between the belts if the lower radial pressure shoe 23 were used alone. Finally, to permit the employment of the apparatus with various belts of different thicknesses the radial pressure shoes (as well as the driving and idler rolls, and the like) should be capable of adjustment with respect to the supporting means for the apparatus.

The scuffing action imparted to the resin-filled cavities by the solid belts is conveniently produced by driving one or both of the solid belts 17 and 19 (depending on whether one or two surfaces of the button blanks are to be pearlescent) at a rate of speed that is different than the rate of speed of the perforated belt 11. Thus, as the sandwich of belts moves through the polymerization zone a solid belt slides across a surface of the perforated belts and of the resin in the filled cavities and imparts a hearing force to the resin surface which tends to orient the light-reflecting platelets dispersed in the resin. The solid belts 17 and 19 may be driven at either a faster or slower rate of speed than the perforated belt 11 but it is preferred to drive them at a faster speed to minimize the power requirements of drive roller 45 of perforated belt 11 and to minimize the tension exerted on the perforated belt 11. The speed of the solid belts relative to that of the perforated belts does not appear to be critical, but it is estimated that the solid belts should move from one-half to twice the speed of the perforated belt to obtain acceptable pearlescence. One skilled in the art can readily determine from observation the difference in belt speeds that produce the desired orientation of the platelets. To prolong the life of solid belts 17 and 19 wear belts 103 and 105 (shown in phantom lines) may be disposed between the solid belts 17 and 19 and radial pressure shoes 23 and 21, respectively.

The scuffing action caused by the difference in speeds of the solid belts 17 and 19 and perforated belt 11 and also by the oscillation of the belt 11 is augmented by vibrating solid belt 17 or solid belt 19, or both, by vibrating means 43. Vibrating means 43 consists of two powerful electromagnets, one on each side of the sandwich of belts, connected to an alternating current source of power. The resulting magnetic impulses cause the solid belts 17 and 19 (which are comprised, at least in part, of a metallic substance responsive to the magnetic forces) to move back and forth across the surface or surfaces of the perforated belt. Alternatively, the perforated belt 11 may be comprised, at least in part, of a metallic substance responsive to the magnetic forces and the solid belts 17 and 19 comprised of substances not responsive to the magnetic forces to bring about the same relative movement of the belts. The belts may also be vibrated by suitable mechanical means.

The frequency and amplitude of vibration do not appear to be critical but the amplitude should be at least twice as great as the largest dimension of the light-reflecting platelets employed to orient the major dimension of the platelets parallel to the major dimension, or face, of the resin in the cavities of the perforated belt 11. The frequency of vibration may be governed by the available power source.

As an alternative embodiment it is contemplated that the light-reflecting platelets be oriented at least in part by vibrating all three belts, the solid belts 17 and 19 and perforated belt 11, simultaneously, and parallel to the major dimension of the resin in the filled cavities, which will subject the resin in the filled cavities to shearing forces throughout their thickness. These shearing forces, it is believed, will also orient the light-reflecting platelets.

Figure 3:
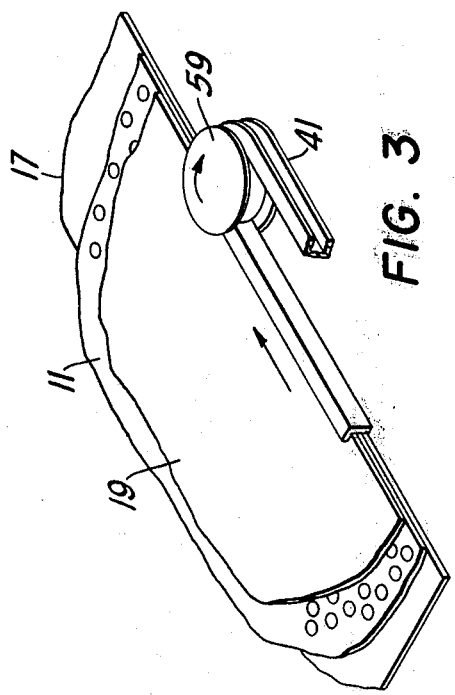
FIG. 3 is an enlargement of a means for sealing the edges of a sandwich of the perforated belt and solid belts.

A belt edge sealing means 41 is provided on each side of the sandwich of belts and prevents air from reaching the resin in the filled cavities at the interfaces of the sandwich of belts. An isometric view of the belt edge sealing means 41 is shown in FIG. 3. The belt edge sealing means 41 is conveniently a continuous, C-shaped, elastomeric belt that engages an edge of the sandwich of belts (belts 19, 11 and 17) and that moves with the belts between idler roller 59 and idler roller 61 (not shown in FIG. 3).

It should be noted at this point that although the term "polymerization zone" has been used to describe that portion of the apparatus of FIG. 1 where the perforated belt 11 is sandwiched between solid belts 17 and 19 it is to be understood that the polymerization of certain liquid polymerizable resins that can be employed in accordance with the invention is not limited to this portion of the apparatus. Thus, for example, a resin may be used that is prepared from two fluid preblends that are mixed just prior to being pumped to the resin feed distributor 25. The resin may begin polymerizing without the application of heat immediately following the mixing of the two preblends and will thus have undergone a degree of polymerization prior to reaching the polymerization zone. Likewise, polymerization of a resin may be effected by the application of heat to a resin in the polymerization zone and may proceed to the point where the resin is solid and non-tacky following its removal from the polymerization zone although theoretically the resin may still be polymerizing or, at least, still polymerizable.

The perforated belt 11 after passing through the polymerization zone is removed from the sandwich of belts and becomes the material discharging portion 15 of the belt. At the discharge portion 15 perforated belt 11 first moves over support plate 37 which is provided to prevent the now-cured button blanks from falling from the cavities of the perforated belt 11. The perforated belt 11 then moves over idler roller 49 and as it bends over the roller 49 it pulls away from the rigid button blanks and the blanks are consequently ejected from the belt (and are collected in a suitable material receiving means 63). An air nozzle 39 directs air against the inside surface of the perforated belt 11 below roller 49 and removes button blanks that may not eject from the belt as it bends over roller 49.

Although the button blanks that eject from the material discharging end 15 of the perforated belt 11 have been described as polymerized or solidified liquid polymerizable resins this terminology is understood to include the B-staging of a polyester resin, i.e., a partial polymerization of a polyester with a cross-linking vinyl monomer. A B-staged resin is, however, solid and non-tacky.

Following their removal from the polymerization zone and prior to their return to the polymerization zone perforated belt 11 and solid belts 17 and 19 are cleaned in cleaning means 33, 31 and 29, respectively. Cleaning means 33, 31 and 29 each comprise a solvent bucket: 97, 95 and 93; a set of guide rollers: 73 and 75, 69 and 71 and 65 and 67; and squeegee rollers designated generally as 101, 99 and 97. Cleaning means 31 and 29 each include a single cleaning brush, 85 and 83, for scrubbing the surface of solid belts 17 and 19 that contacts and scuffs the liquid polymerizable resin while the resin is polymerizing in the cavities of belt 11. Cleaning means 33 includes two cleaning brushes 87 and 89 since both surfaces of perforated belt 11 may contain residues of the liquid polymerizable resin. Any solvent suitable for the particular resin employed may be used to clean the surfaces of the belts. The squeegee rollers quite naturally are used to prevent an excess loss of the solvent.

As a typical illustration of the operation of the invention and of the apparatus of FIG. 1, two parts of basic lead carbonate light-reflecting platelets are added to 100 parts of a general purpose styrene-based polyester resin adjusted so as to have a viscosity of 1200 cps. The mixture is stirred for thirty minutes to provide a uniform dispersion and is then divided into two equal parts. To one of the two equal parts is added an amount of a promoter or a mixture of promoters and to the other part an amount of catalyst, said amounts having been predetermined to give a resin cure time of 3–5 minutes at 200°F. After stirring, the solutions are charged to separate storage tanks and are subjected to a reduced pressure to remove air. Control valves on the storage tanks are then opened to allow the resin stocks to flow to a suitable mixing area prior to being pumped to the resin feed distributor 25. From the resin feed distributor 25 the resin is applied to perforated belt 11 and its flow rate is adjusted by means of regulator 107 and float 108 so as to allow a small buildup of resin behind the doctor blade 27 (to insure that each cavity is completely filled). The perforated belt is driven at a steady speed of 1 inch/sec and is oscillated by cam mechanism 106 at approximately 1 cycle/sec and a magnitude of ¾ inch. The perforated belt 11 is one-eighth inch thick, 15 inches wide and 30 feet long (the length in the polymerization zone) and is made of polyethylene. A plurality of ⅜, ½, and ⅝-inch diameter holes are spaced along its width and length. The perforated belt 11 travels from the material receiving portion 11 to the polymerization zone where it is heated by means of the radial pressure shoes 21 and 23 to a temperature of 200°F. Simultaneously stainless steel solid belts 17 and 19 are traveling at a speed of 2 inches/sec and slide across the surface of belt 11 and the resin in the filled cavities thereby scuffing the surface of the resin and orienting the light-reflecting platelets parallel to the resin surface. The scuffing action caused by the difference in the speeds of the solid and perforated belts and the oscillation of the perforated belt with respect to the solid belts is augmented by vibrating the two solid stainless steel belts. Two powerful electromagnets 43 one situated on each side of the polymerization zone are connected to an alternating current power supply and cause the solid stainless steel belt 17 and 19 to vibrate at a frequency of 60 cycles/sec and an approximate amplitude of 1/64 inch. The solid belts 17 and 19 are of course comprised of a type of stainless steel that is responsive to magnetic forces.

Following the removal of the perforated belt 11 from the pressure shoes 21 and 23 (the polymerization zone) and after bending the belt 11 over the idler roller 49, button blanks having highly pearlescent surfaces are ejected from the belt and collected at location 63. The button blanks which at the collection stage are only a B-staged polyester resin are then subjected to final polymerization conditions and polished and drilled to produce finished pearlescent buttons.

In summary, the invention provides a method for eliminating the waste that is normally associated with the heretofore known methods of manufacturing button blanks by casting a liquid polymerizable resin containing light-reflecting platelets in confined regions of predetermined configuration, such as, for example, the cavities of a continuous perforated belt, and thereafter polymerizing the resin while simultaneously scuffing a surface of the resin in the confined regions to orient the light-reflecting platelets parallel to the surface of the castings. An apparatus for carrying the method of the invention has also been described.

It is of course understood, however, that the method of the invention can be carried out by the other apparatus without departing from the theme or scope of the invention. The invention is therefore not intended to be limited to the embodiments described but includes all alternatives, modifications, and equivalents as may be included within the spirit and scope of the invention as defined by the appended claims.

I claim:

1. A method for making pearlescent button blanks comprising:

a. contacting the undersurface of a first flat member having plural perforations therein in the shape of button blanks with an unperforated second flat member to form plural mold cavities in the shape of button blanks, b. filling the cavities with a polymerizable resin containing light reflecting platelets, c. contacting the upper surface of the resin in the cavities and the first flat member with an unperforated third flat member, d. causing linear movement of the three flat members in the same direction but with one of the solid flat members moving at a speed different from the perforated first flat member so as to scuff the surface of the polymerizable resin in contact with the solid flat member that is moving at a different speed thereby causing the light reflecting platelets to orientate parallel to the resin surface being scuffed, e. moving the three flat members through a polymerization zone during the scuffing to polymerize the resin while the light reflecting platelets are oriented, f. separating the solid flat members from the perforated flat member and ejecting the pearlescent button blanks from the perforated flat member.

2. A method as in claim 1 wherein both the second and the third solid flat members are moving at a speed faster than the perforated first flat member.

3. A method as in claim 1 wherein the scuffing is augmented by oscillating the perforated flat member with respect to the solid flat members.

4. A method as in claim 1 wherein the scuffing is augmented by vibrating the solid flat members parallel to the surfaces of the resin in the cavities.

5. A method as in claim 1 wherein the polymerizable resin is a polyester resin and the light reflecting platelets are basic lead carbonate crystalls.

6. A method for producing pearlescent button blanks comprising:
   a. contacting the bottom surface of a first continuous belt having a plurality of perforations therein in the shape of button blanks with the upper surface of a second solid continuous belt thereby forming a plurality of mold cavities in the shape of button blanks,
   b. filling the cavities with a polymerizable resin containing light reflecting platelets,
   c. contacting the upper surface of the perforated belt with the bottom surface of a third solid continuous belt to form a sandwich of the perforated belt between the solid belts,
   d. moving the perforated belt and one of the solid belts in the same direction at different speeds thereby scuffing the surface of the polymerizable resin in contact with the solid belt moving at a different speed thereby causing the light reflecting platelets to orientate parallel to the surface being scuffed,
   e. moving the sandwich of belts through a polymerization zone to polymerize the resin while the light reflecting platelets are oriented,
   f. separating the solid belts from the perforated belt and ejecting the pearlescent button blanks from the perforated belt.

7. A method as in claim 6 wherein both solid belts are moving at a speed faster than the perforated belt.

8. A method as in claim 6 wherein the scuffing is augmented by oscillating the perforated belt with respect to the solid belts.

9. A method as in claim 6 wherein the scuffing is augmented by vibrating the solid flat belts parallel to the surfaces of the resin in the cavities.

10. A method as in claim 6 wherein the polymerizable resin is a polyester resin and the light reflecting platelets are basic lead carbonate crystalls.

* * * * *